United States Patent
Altshuller et al.

(10) Patent No.: US 8,219,117 B2
(45) Date of Patent: Jul. 10, 2012

(54) METHOD OF PAGING A MOBILE TERMINAL

(75) Inventors: Mark Altshuller, Netanya (IL); Oleg Marinchenco, Modein (IL); Leonid Shousterman, Herzlia (IL)

(73) Assignee: Alvarion Ltd., Tel-Aviv (IL)

( * ) Notice: Subject to any disclaimer, the term of this patent is extended or adjusted under 35 U.S.C. 154(b) by 258 days.

(21) Appl. No.: 11/362,373

(22) Filed: Feb. 27, 2006

(65) Prior Publication Data

US 2007/0202871 A1   Aug. 30, 2007

(51) Int. Cl.
*H04W 68/00* (2009.01)
*H04W 36/00* (2009.01)

(52) U.S. Cl. ............... 455/458; 455/436; 455/456.1; 370/331

(58) Field of Classification Search .......... 455/515, 455/426.1, 436–444, 456, 41.1–41.3, 456.1–458, 455/428, 456.1–457; 370/338, 331
See application file for complete search history.

(56) References Cited

U.S. PATENT DOCUMENTS

| | | | | |
|---|---|---|---|---|
| 6,047,183 | A * | 4/2000 | Kingdon et al. | 455/440 |
| 6,490,451 | B1 * | 12/2002 | Denman et al. | 455/426.1 |
| 2003/0104813 | A1 * | 6/2003 | Julka et al. | 455/436 |
| 2006/0009241 | A1 * | 1/2006 | Ryu et al. | 455/458 |
| 2006/0018291 | A1 * | 1/2006 | Patel et al. | 370/335 |
| 2006/0099950 | A1 * | 5/2006 | Klein et al. | 455/439 |
| 2006/0268834 | A1 * | 11/2006 | Bajic | 370/352 |
| 2007/0060127 | A1 * | 3/2007 | Forsberg | 455/436 |
| 2007/0105567 | A1 * | 5/2007 | Mohanty et al. | 455/458 |

* cited by examiner

*Primary Examiner* — Lester Kincaid
*Assistant Examiner* — Daniel Lai
(74) *Attorney, Agent, or Firm* — Abraham Hershkovitz; Harold L. Novick; Hershkovitz & Associates, LLC

(57) ABSTRACT

In a wireless network which comprises a first plurality of base stations and a second plurality of access network gateways, there is provided a method for tracking and/or paging a mobile terminal, wherein the method comprises the steps of: providing a mobile terminal located within the wireless network, and wherein the mobile terminal is in an active mode; selecting a first access network gateway out of the second plurality of access network gateways to be an anchor gateway for location and/or paging control for the mobile terminal; and upon receiving at the first access network gateway a request for a location update of the mobile terminal which has meanwhile entered an idle mode, selecting a base station for communicating with the mobile terminal from among the first plurality of base stations, and providing the selected base station with information required for verifying the identity of the mobile terminal and/or for retaining the security integrity of the selected base station while carrying out location update of the mobile terminal. Preferably, the paging Controller ID (or its location) is used for the update of the traffic anchored GW, and can then be used for allocating the paging controller by the traffic anchored GW during the paging procedure.

8 Claims, 3 Drawing Sheets

METHOD OF PAGING A MOBILE TERMINAL

FIELD OF THE INVENTION

The present invention relates generally to mobile wireless communication, and more specifically to paging techniques associated with mobile terminals operating in wireless communications systems.

BACKGROUND OF THE INVENTION

A terminal in a wireless communication system (e.g., a cellular phone in a cellular system) is typically designed to operate at any given moment in one of several modes, such as active and idle modes. In the active mode, the terminal can actively exchange data with one or more base stations belonging to the system (e.g., for conducting a voice or data call). In the idle mode, which may also be referred to as a standby mode, the terminal typically monitors a channel (a paging channel) for messages alerting the terminal to the presence of incoming calls. The wireless mobile network typically requires the terminal to be in idle mode for relatively long periods in order to reduce the traffic load due to carrying out unessential processes in the network.

In more details, when determined that a current mode is not an active mode, individual terminals operating in such a conventional cellular network remain in an idle mode and are occasionally awaken from the idle mode to check reception of paging signals addressed to them. If the paging signal is transmitted to any one of the terminals, that terminal would change its own mode to an active mode. Otherwise, when no paging signal has been transmitted to the terminal, it would re-enter the idle mode.

Now, even though they may be in idle mode, mobile wireless terminals can move from one location to another. As a result, the location of a moving terminal may change while being in an idle mode, and when the terminal wakes up, it can no longer communicate with the base station it communicated before entering the idle mode, and will have to communicate through a different base station. Typically, when changing base stations, a wireless terminal is expected to conduct a "handoff" process whereby the new base station is contacted, and arrangements are made for this new base station to serve the wireless terminal. When a wireless terminal is in an active, such a procedure will be followed. But, when the wireless terminal is in an idle mode, this is typically not the case. Such handoffs are power consuming and make use of the system resources that could otherwise be used to carry data traffic. Furthermore, it could well be that a mobile terminal enters an area serviced by another, a second base station while being in a sleep mode, and will leave that area to an area serviced by a further, a third base station, before awakening. In such a case, all resources allocated to by the second base station to service the terminal are wasted for no good reason. To avoid these penalties, prior art systems have defined "paging areas" in which an idle wireless terminal need not conduct a handoff. Instead, all of the base stations located within the paging area will broadcast the paging messages addressed for the idle wireless terminal. The wireless terminal then needs only to tune its receiver to the base station from which the best signal is received and continue communicating through that base station. A central controller keeps track of which paging area each wireless terminal is in.

Several methods and solutions addressing certain aspects of this type of operation have been suggested in the art.

US 20050048982 discloses the use of a controller for wireless communication system, which receives sufficient system information to process paging channel for a base station, prior to the completion of cell reselection procedure.

EP 1124399 discloses a paging method for wireless terminals that involves assigning new paging agent to the wireless terminal. When the wireless terminal assigned with the paging agent moves outside the paging area, the wireless terminal is provided with the capability to define its own "personal" paging area using a list of all the base stations that it knows.

WO 0207459 discloses several techniques for a terminal to efficiently process paging channels in an asynchronous wireless communication system. If the base stations are not synchronized with each other and a remote terminal's designated paging time is different from one base station to another, the remote terminal can wake up based on the earliest base station paging time in a reacquisition search list that includes candidate base stations to which the remote terminal may be handed off. The criteria to select base stations for evaluation as reacquisition targets, may be based on the received power of the signals received from the various base stations as well as on their timing, where both of these parameters may be made relative to that of a preferred base station. Also, the remote terminal may wake up a number of times in a particular paging cycle if there are one or more candidates base station to which the remote terminal may be handed off.

WO 05022781 discloses an apparatus for controlling a sleep mode in a wireless access communication system which involves determining paging interval type of specific subscriber terminal, based on paging interval types and sleep request message received from specific terminal. The subscriber terminal is registered in one of the groups determined on the basis of the paging interval type of the subscriber terminal. Upon receipt of the group information, the apparatus controls a base station to pre-recognize a terminal woken up at a predetermined time from among a plurality of terminals entering the sleep mode, resulting in reduction of the number of unnecessary paging message transmissions and improved efficiency of the wireless access communication system.

Current mobile networks use a centralized entity for controlling paging operations to mobile terminal(s) being in idle mode. However, this solution is not an adequate solution to networks where the number of mobile terminals is rapidly growing as the time and resources required to support such a centralized entity to properly function increase dramatically.

LEGEND

The following is a list of meanings associated with certain abbreviations used hereinafter in the description of the invention:

AAA—Authentication, Authorization and Accounting
AKn—Acknowledge message
ALR—Authentication Location Register
ASN—Access Service Network
BS—Base Station
CSN—Connectivity Service Network
DHCP—Dynamic Host Configuration Protocol
DP—Decision Point (Logical Point located in the ASN GW, and is operative to identify ASN control functions such as authentication)
EAP—Extensible Authentication Protocol
EP—Enforcement Point (Logical Point located in the ASN GW, and is operative to identify ASN bearer functions such FA (Foreign Agent), ASN data path function, and the like
FA—Foreign Agent
GW—Gateway
HO—Handover IP—Internet Protocol
MSS—Mobile Subscriber Station (also used as mobile terminal)
NAP—Network Access Provider
NAS—Network Access Server
PC—Paging Controller
QoS—Quality of Service
PMK—Primary Master Key

SUMMARY OF THE INVENTION

It is an object of the present invention to provide a method that allows efficient paging and location controller searching during mobile terminal location update and paging.

It is another object of the present invention to provide a method that allows reducing time during mobile terminal location update and paging.

It is still another object of the present invention to provide a solution that supports paging and location control functionality for distributed mobile networks, *e.g. where there is no single entity that controls all base stations associated with that network).

Other objects of the invention will become apparent as the description of the invention proceeds.

According to an embodiment of the present invention, there is provided in a wireless network which comprises a first plurality of base stations and a second plurality of access network gateways, a method for tracking and/or paging a mobile terminal, wherein the method comprises the steps of:

providing a mobile terminal located within the wireless network and wherein that mobile terminal is in an active mode;

selecting a first access network gateway out of the second plurality of access network gateways, to be an anchor gateway for location and/or paging control for the mobile terminal;

upon receiving at the first access network gateway a request for a location update of the mobile terminal which has meanwhile entered an idle mode, selecting a base station for communicating with the mobile terminal from among the first plurality of base stations, and providing the selected base station with information required for verifying the identity of the mobile terminal and/or for retaining the security integrity of said selected base station while carrying out location update of the mobile terminal.

According to another embodiment of the invention, the communications exchanged between the selected base station and the first access network gateway, are carried indirectly via a different access network gateway.

In accordance with yet another embodiment, the selected base station is other than the base station with which said mobile terminal was in communication prior to entering the idle mode.

Preferably, the wireless network is adapted to implement authentication location registering and/or paging controlling functionalities associated with the mobile terminal.

By still another embodiment of the invention, the method provided further comprising a step of providing the mobile terminal with information that would allow identification of the first access network gateway. This step preferably comprises the following:

providing the mobile terminal with a paging controller ID parameter; and providing the mobile terminal with a value associated with the PCID, indicating which access network gateway will be its corresponding anchor authenticating gateway.

According to still another embodiment, the method further comprises the step of updating the first access network gateway about the mobile terminal's location, at times after the latter has entered an idle mode.

In accordance with yet another embodiment of the invention, the method further comprising the step of defining at least one virtual group comprising a plurality of base stations each associated with the access wireless network and located in a geographical vicinity from each other. Preferably, upon exiting the geographical vicinity of the virtual group of the plurality of base stations, the mobile terminal initiates a request to update its own location. More preferably, the base station that receives this request, communicates with the first access network gateway to confirm the authenticity of the request thus received.

By still another embodiment of the invention, the method provided further comprises a step of initiating a paging procedure to be carried out in response to the arrival of traffic addressed to the mobile terminal at an access network gateway associated with a base station that was last in communication with the mobile terminal before the latter has entered an idle mode. Preferably this step comprises the steps of:

notifying the first access network gateway, being the anchor gateway for that mobile terminal and associated with a paging controller, about the arrival of traffic addressed to the mobile terminal; and initiating the paging procedure by the anchor paging controller.

In accordance with another preferred embodiment of the invention, the first access network is adapted to implement authentication location register ("ALR") and paging controller ("PC") functionality associated with the mobile terminal.

In accordance with another preferred embodiment of the invention, the access wireless network is adapted to implement "anchor authenticator" functionality associated with the mobile terminal.

By yet another embodiment of the invention, the step of providing the mobile terminal with information to allow identification of the access gateway, comprises:

providing the mobile terminal with a paging controller ID ("PCID") parameter; and providing the mobile terminal with a value associated with the PCID, indicating the access gateway that will be its corresponding anchored authenticating gateway.

Preferably, the paging procedure comprises:
identifying the mobile terminal location;
sending paging request messages to access gateways that are associated with base stations that belong to the relevant paging group (optionally or in the alternative, paging request messages may be sent directly to these base stations);
sending paging request messages by these access gateways to relevant base stations;
broadcasting a paging message by each of the relevant base stations;
upon receiving the broadcasted paging request by the mobile terminal, the mobile terminal may begin carrying out a network re-entry phase.

DETAILED DESCRIPTION OF PREFERRED EMBODIMENTS

Typically, an access server network (ASN) comprises network elements such as Base Station(s) (arranged in one or more Base Station Clusters) and ASN Gateway(s) where the latter that may be shared by more than one CSNs. The paging operation as described herein may be carried out within the ASN or after/while crossing the ASN boundaries.

Figure 1:
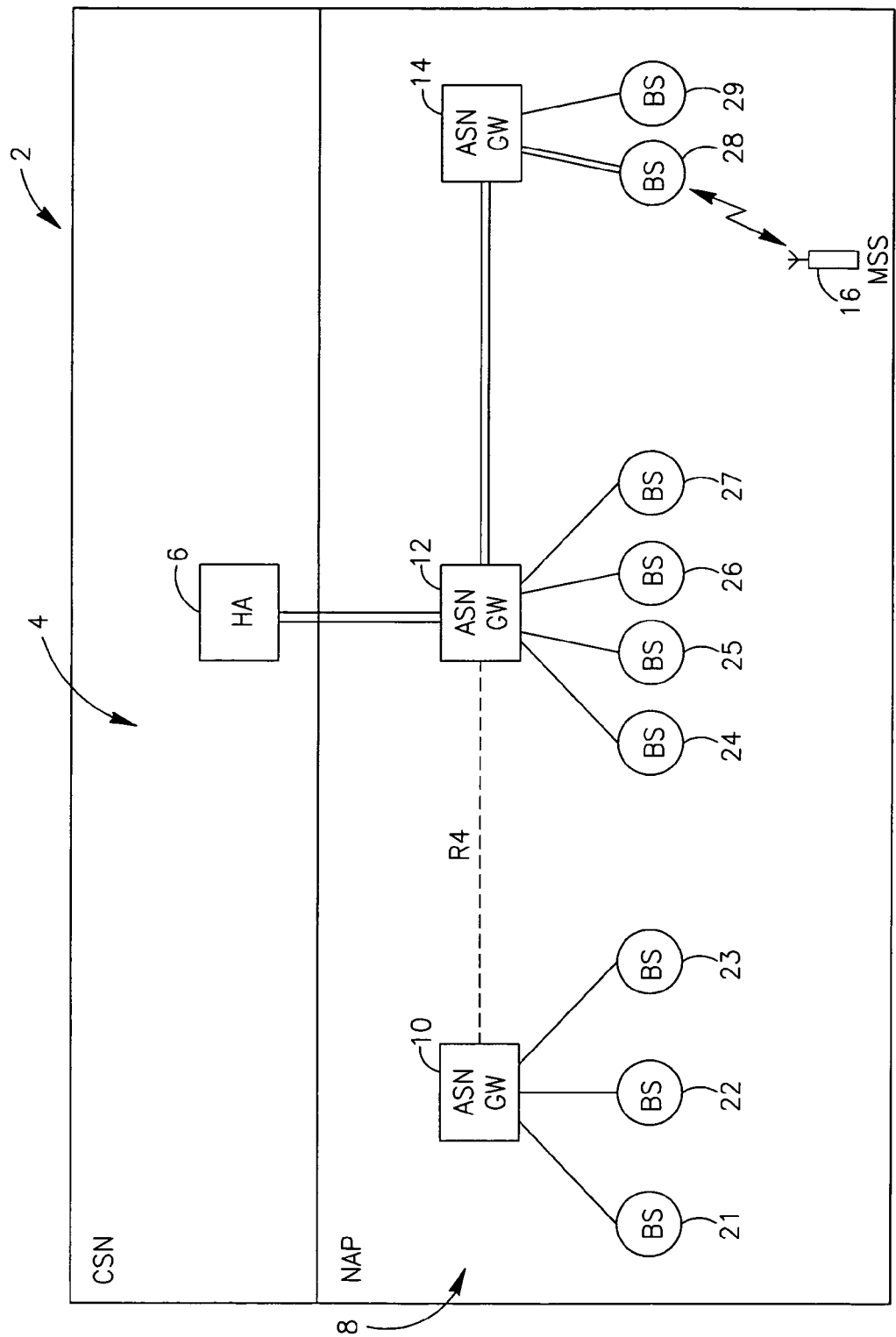
FIG. 1—illustrates a schematic presentation of a system configuration that is adapted to support a method in accordance with the present invention.

In FIG. 1 there is provided an example of a system configuration adapted to allow carrying out a method in accordance with the present invention. System 2 comprises two networks, Connectivity Service Network (CSN) 4 of MSS 16 and the network of the access provider (NAP) 8. CSN 4 comprises home agent (HA) 4, which is operative to communicate with a number of gateways (10, 12, 14) each located in a corresponding access service network, all of which comprising NAP 8. In the example shown in this Figure, gateway 10 is used as the MSS anchored authenticating entity, gateway 12 is the MSS anchored foreign agent, while gateway 14 is the serving gateway of the base station, through which is operative to communicate with MSS 16. However, as will be appreciated by those skilled in the art, other combinations such as a single gateway carrying out for example both the foreign agent functionality and the MSS anchored authenticator are possible and should be considered to be encompassed by the present invention. Each of the gateways shown is operative to communicate with a number of base stations, from among the group 21 to 29, where base station 28 is shown to be currently in communication with MSS 18.

Figure 2:
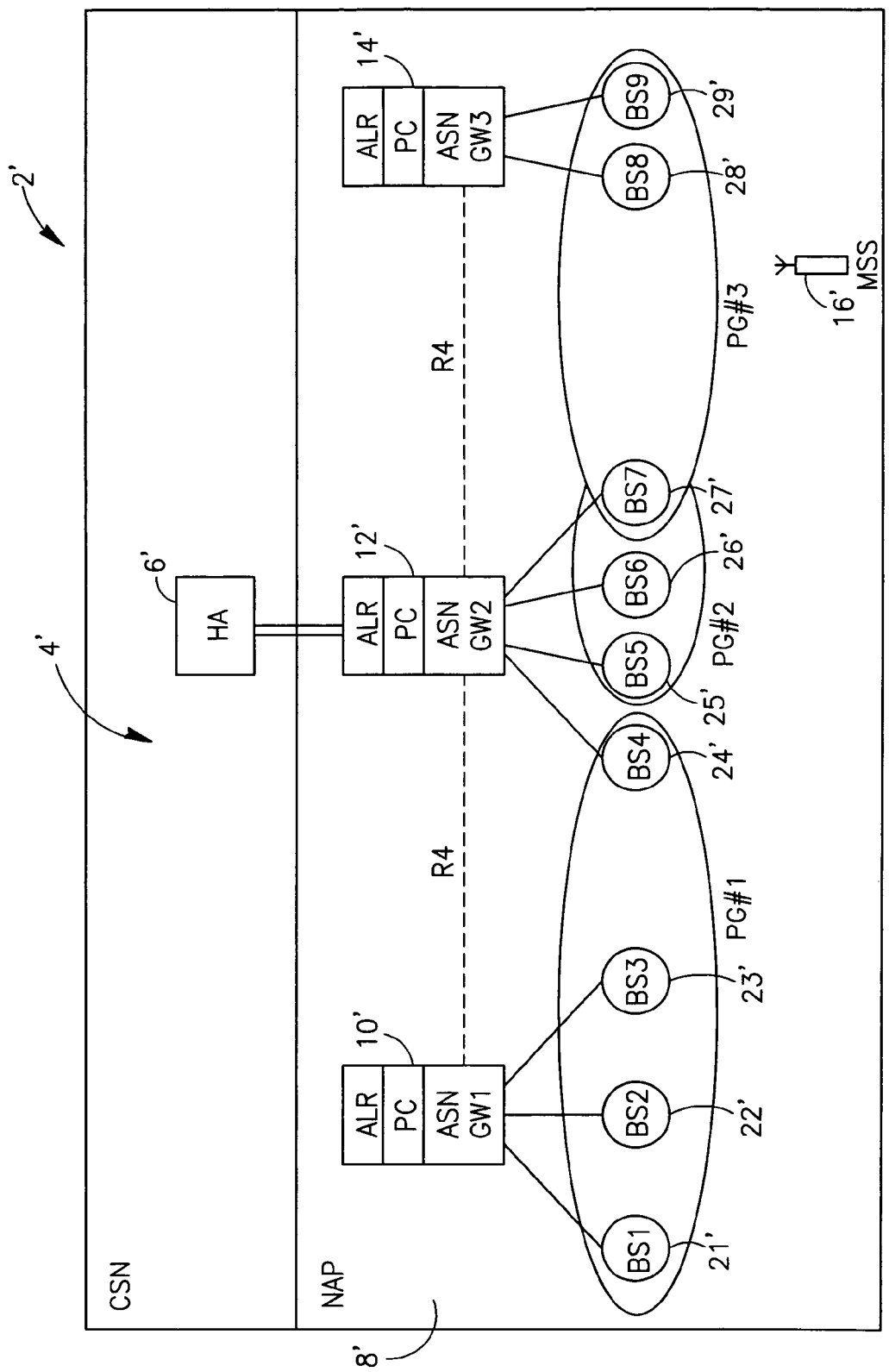
FIG. 2—illustrates schematically the infrastructure required to carry out a preferred embodiment of the invention.

Referring now to FIG. 2, illustrating the system referred to in FIG. 1. Base stations 21' to 29', have been arranged in three paging groups 31 to 33, some of which (in this example base stations 24' and 27') may belong to more than one paging group. Now, in order to carry out the embodiment of the invention described herein, the appropriate ALR/PC information is provided to the applicable gateways 10', 12' and 14', as will be further discussed.

Let us now consider the case where mobile subscriber station (MSS) 16' enters an idle mode. The serving BS 28' in this case is directly connected to an ASN GW (serving GW) 14', while the FA serving that MSS that was determined before, e.g. upon entering of the MSS to the ASN) is located in this example in another ASN GW (anchor GW) 10'. The serving GW and anchor GW may be communicatingly connected via an R4 interface. Still, the context associated with the MSS (e.g. security context, QoS profile, etc.) may be stored for example in yet another ASN GW (anchor authenticating GW). According to the present invention, a full network re-entry procedure may be avoided upon location updates.

Preferably, the BS which responds to the MSS location update (e.g. the one which would send RNG_RSP) should be able to receive acknowledgment messages (AK), therefore would need to communicate with the anchor authenticating GW.

By another preferred embodiment of the invention, the assignment made by the BS of paging groups should be flexible and independent of the ASN GWs. The ASN GW acting as an anchored authenticator for the specific MSS should preferably be the entity to implement ALR and PC functionality for a given MSS.

To make the anchored authenticator ID (and consequently the ALR/PC) known to MSS, the following may be adopted:

Using a paging controller ID parameter which is provided to the MSS just prior to entering idle mode (e.g. in DREG_CMD message);

The value associated with the PCID indicates to the MSS's which is the anchored authenticating ASN GW;

Consequently, when the MSS is carrying out a location update, the serving BS becomes aware of the MSS's anchor authenticating GW.

Next, when the MSS performs network re-entry from its idle mode, the following steps are preferably carried out:

Information related to the MSS (e.g. the MSS context) is provided to the serving BS from the anchor authenticating GW;

The serving BS initiates GRE tunnel establishment, e.g. over R6 & R4 interfaces, towards the MSS anchored GW (FA)

Figure 3:
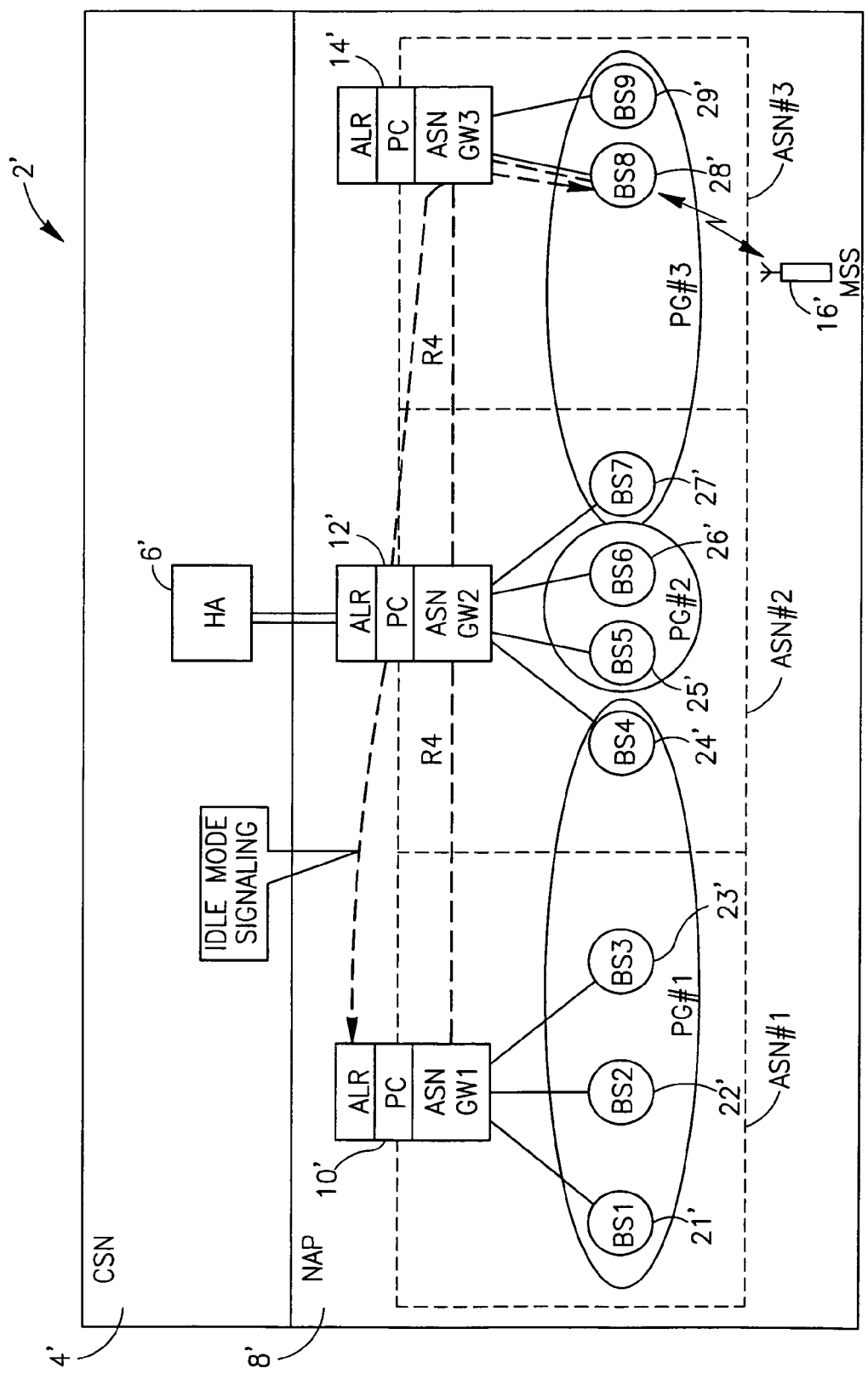
FIG. 3—exemplifies a network configuration when the MSS enters idle mode.

FIG. 3 illustrates some of the events occurring when the MSS enters an idle mode (a stage which, as will be appreciated by those skilled in the art, could be a short while before or after the exact point in time of entering the idle mode):

ALR/anchored authenticating entity is updated with the last location of the MSS, and preferably with other pertinent information;

MSS is provided with the ID of its own anchored authenticator (via PCID parameter associated with the DREG_CMD).

R6 and R4 interfaces' data paths are established to extend up to the anchored ASN GW (FA). The anchored ASN GW keeps MIP tunnel open towards the HA in the CSN.

When the MSS crosses the paging group ("PG") boundaries:

The MSS will preferably send RNG_REQ with PCID and MSID in order to update its own location;

The BS will then communicate with the MSS' anchored authenticator in order to receive AK and to check the authenticity of the RNG_REQ message;

The BS will then send RNG_RSP to the MSS and thereafter location updates to the respective anchored authenticator (ALR);

The anchored authenticator GW (ALR) on its part, will keep track (e.g. by updating relevant record(s) stored thereat) of the recent MSS' location.

When the MSS re-enters active mode after being in an idle mode:

The MSS sends RNG_REQ, preferably with one or more reasons indicating its re-entering from idle mode, as well as PCID and MSID;

The BS will then communicate with the MSS' anchored authenticator in order to receive AK and any additional information related to the MSS as necessary (e.g. the location of anchored GW, service flows, etc.) and checks the authenticity of the RNG_REQ message;

Then, the BS re-establishes the data path towards the anchored GW (FA) via the serving ASN GW over R6/R4 interface;

Following the re-establishment of the data path, the BS sends to the MSS a RNG_RSP message;

The MSS will then complete the network re-entry procedure.

Next, let us consider the MSS paging procedure:

Paging is preferably triggered by the traffic entering the anchor GW (FA);

The anchor GW notifies the anchored authenticating GW (ALR/PC);

Then, the anchored authenticator (ALR/PC) will initiate paging process, which preferably includes the following steps:

identifying MSS location (paging group ID);
sending paging request messages to the ASN GWs that are associated with BSs that belong to the paging group;
ASN GWs sends paging request messages to the relevant BSs;
All the BSs participating in the paging group send BS_Broadcast_Paging_Msg;
Upon receiving the BS_Broadcast_Paging_Msg message, the MSS may start network re-entry in a way as described above, or in any other applicable way.

Preferably, at this stage the following steps may be carried out:

Paging Controller is made aware of the paging group(s) that each BS belongs to;
Location update procedure(s) is/are applied to provide the paging controllers(s) of the MSS last known location;
Incoming data at ASN-GW of last connected FA triggers request to be sent to the paging controller which returns paging group of the last known location, so that the paging request may be sent to the mobile terminal.

According to another embodiment of the present invention, when the MSS becomes active, the paging controller may delete/remove the MSS corresponding entries from the PC.

Some of the advantages associated with the present invention are, that the network manager does not require PC information when the mobile terminal is active or idle, new idle entry may be associated with new PC, and PC or LR data base may be dynamically updated and comprise primarily idle mode related data.

It is to be understood that the above description only includes some embodiments of the invention and serves for its illustration. Numerous other ways of carrying out the methods provided by the present invention may be devised by a person skilled in the art without departing from the scope of the invention, and are thus encompassed by the present invention.

The invention claimed is:

1. In a wireless network which comprises a plurality of base stations that includes at least a first subnet and a second subnet of base stations and a plurality of access network gateways, a method for tracking and/or paging a mobile terminal, wherein the method comprises the steps of:
   providing a mobile terminal located within the first subnet of said wireless network and wherein said mobile terminal is in an active mode and communicating with a first base station in the first subnet of base stations;
   selecting a first access network gateway out of said plurality of access network gateways to be an anchor gateway for location and/or paging control associated with said mobile terminal;
   providing said mobile terminal with information that allows identifying said anchor gateway;
   following a period during which said mobile terminal has been in an idle mode, receiving a message at a second base station from said mobile terminal, said message being for carrying out a location update for said mobile terminal and comprising an indication that allows identifying said anchor gateway, said second base station being located in the second subnet;
   informing said anchor gateway by said second base station that a request to perform said location update has been made; and
   upon receiving, at said anchor gateway the request for a location update of said mobile terminal, said anchor gateway provides said second base station with information required for verifying the identity of said mobile terminal and/or for retaining the security integrity of said second base station while carrying out location update of said mobile terminal.

2. A method according to claim 1, wherein said second base station is other than the base station with which said mobile terminal was in communication prior to its entering the idle mode.

3. A method according to claim 1, wherein said anchor gateway comprised in said wireless network is adapted to implement authentication location registering and/or paging controlling functionalities associated with said mobile terminal.

4. A method according to claim 1, further comprising a step of providing said mobile terminal with information to allow identification of said anchor gateway, which comprises:
   providing said mobile terminal with a paging controller ID (PCID) parameter; and
   providing said mobile terminal with a value associated with the PCID, indicating which access network gateway will be its corresponding anchor authenticating gateway.

5. A method according to claim 1, further comprising a step of updating said anchor gateway about said mobile terminal's location, at times after the latter has entered an idle mode.

6. A method according to claim 1, further comprising the a step of defining at least one virtual group comprising a plurality of base stations each associated with said access wireless network and located in a geographical vicinity from each other.

7. A method according to claim 6, and wherein upon exiting the geographical vicinity of said virtual group of the plurality of base stations, said mobile terminal initiates a request to update its own location.

8. A method according to claim 7, wherein a base station receiving said request, communicates with said anchor gateway to confirm the authenticity of the request thus received and to update information at said anchor gateway, which relates to the current location of the mobile terminal.

* * * * *